(12) United States Patent
Watanabe

(10) Patent No.: US 6,847,758 B1
(45) Date of Patent: Jan. 25, 2005

(54) METHOD, OPTICAL DEVICE, AND SYSTEM FOR OPTICAL FIBER TRANSMISSION

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 09/637,640

(22) Filed: Aug. 14, 2000

(30) Foreign Application Priority Data

Aug. 26, 1999 (JP) ............................................. 11-239854

(51) Int. Cl.[7] ............................................... G02B 6/42
(52) U.S. Cl. ...................... 385/27; 385/122; 385/123; 359/333; 359/332; 359/179; 359/109; 359/337; 359/135; 359/194
(58) Field of Search ................................ 385/122, 123, 385/27; 359/333, 179, 109, 337, 135, 194, 332

(56) References Cited

U.S. PATENT DOCUMENTS

| | | | | |
|---|---|---|---|---|
| 5,271,024 A | * | 12/1993 | Huber ............................ 372/6 |
| 5,499,134 A | * | 3/1996 | Galvanauskas et al. ..... 359/333 |
| 5,522,004 A | * | 5/1996 | Djupsjobacka et al. ..... 385/123 |
| 5,566,197 A | * | 10/1996 | Nillsson ....................... 372/20 |
| 5,777,770 A | * | 7/1998 | Naito .......................... 359/179 |
| 5,838,487 A | * | 11/1998 | Nilsson et al. .......... 359/337.12 |
| 5,880,877 A | * | 3/1999 | Fermann et al. ....... 359/341.31 |
| 6,108,474 A | * | 8/2000 | Eggleton et al. ............. 385/122 |
| 6,198,568 B1 | * | 3/2001 | Galvanauskas et al. ..... 359/332 |
| 6,236,498 B1 | * | 5/2001 | Freeman et al. .......... 359/337.1 |
| 6,356,383 B1 | * | 3/2002 | Cornwell et al. ............ 359/334 |

OTHER PUBLICATIONS

Lowry et.al., "Signal Speed Gets Boost from Tiny Amplifier", Oct. 1996, Science and Technology Report, pp. 18 and 19.*

Saito et al., "Prechirp Technique for Dispersion Compensation for a High–Speed Long–Span Transmission", Jan. 1991, IEEE Photonics Technology Letters, pp. 74–76.*

* cited by examiner

*Primary Examiner*—Hemang Sanghavi
*Assistant Examiner*—Eric Wong
(74) *Attorney, Agent, or Firm*—Staas & Halsey LLP

(57) ABSTRACT

The present invention relates to a method for optical fiber transmission which can increase a transmission distance. A first optical fiber having dispersion is first provided. An optical signal is next supplied to the first optical fiber so that the optical signal is compressed on the time axis as propagating in the first optical fiber. In the case that the dispersion is normal dispersion, for example, prechirping is performed so that the optical signal has down-chirp. A compressed optical signal output from the first optical fiber is supplied to an optical device having a saturated gain. According to this method, the transmission distance can be increased by the effective combination of compression of the optical signal and waveform shaping by the optical device.

23 Claims, 13 Drawing Sheets

F I G.13A 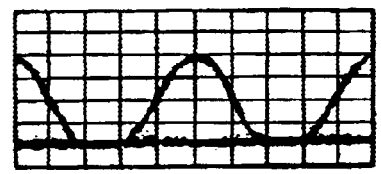
F I G.13B 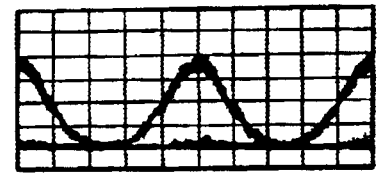
F I G.13C 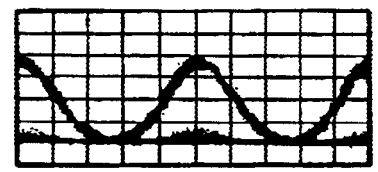
F I G.13D 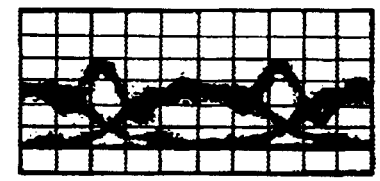
F I G.13E 

METHOD, OPTICAL DEVICE, AND SYSTEM FOR OPTICAL FIBER TRANSMISSION

BACKGROUND OF THE INVENTION

1. Field of the Invention

The present invention relates to a method, optical device, and system for optical fiber transmission.

2. Description of the Related Art

Owing to recent developments of low-loss silica optical fibers, various optical fiber communication systems each using such an optical fiber as a transmission line have been put to practical use. The optical fiber itself has a very wide band. However, a transmission capacity by the optical fiber is actually limited by a system design. The most important limitation is due to waveform distortion by chromatic dispersion occurring in the optical fiber. Further, the optical fiber attenuates an optical signal at a rate of about 0.2 dB/km, for example. Loss of the optical signal due to this attenuation has been compensated for by adopting an optical amplifier such as an erbium doped fiber amplifier (EDFA) that is a typical example.

The chromatic dispersion that is often referred to simply as dispersion is a phenomenon such that the group velocity of an optical signal in an optical fiber changes as a function of the wavelength (frequency) of the optical signal. In a standard single-mode fiber, for example, an optical signal having a longer wavelength propagates faster than an optical signal having a shorter wavelength in a wavelength region shorter than 1.3 $\mu$m, and the resultant dispersion is usually referred to as normal dispersion. In contrast, an optical signal having a shorter wavelength propagates faster than an optical signal having a longer wavelength in a wavelength region longer than 1.3 $\mu$m, and the resultant dispersion is usually referred to as anomalous dispersion.

In recent years, the nonlinearities of an optical fiber have received attention in association with an increase in optical signal power due to the use of an EDFA. The most important nonlinearity that limits a transmission capacity is an optical Kerr effect occurring in an optical fiber. The optical Kerr effect is a phenomenon such that the refractive index of an optical fiber changes with the intensity of an optical signal. A change in the refractive index modulates the phase of an optical signal propagating in an optical fiber, resulting in the occurrence of frequency chirping which changes a signal spectrum. This phenomenon is known as self-phase modulation (SPM). Spectral broadening due to SPM occurs to cause further enlargement of the waveform distortion due to chromatic dispersion.

Thus, in optical fiber communication, the waveform degradation due to the dispersion of an optical fiber or the nonlinear optical effects in an optical fiber becomes a large factor of transmission limit. The influence of the dispersion increases with an increase in width of a signal band, and becomes significant in proportion to the square of a signal speed. Accordingly, a transmission distance in transmission of a high-speed signal is remarkably limited. Various dispersion compensating methods have been invented and put to practical use to compensate for the dispersion.

As a typical example of the methods for compensating the transmission waveform distortion due to dispersion, a method using a dispersion compensator is known. A dispersion compensating fiber providing a large dispersion or a compensating device such as a fiber grating is known as the dispersion compensator. Other known dispersion compensating methods include a method of alternately arranging positive and negative dispersions along a transmission line to configure a transmission line having substantially zero dispersion, and a method of arranging an optical phase conjugator along a transmission line to compensate for a phase change due to dispersion. The compensating method using the optical phase conjugator can also compensate for the nonlinear optical effects.

As an example of the method of simply compensating the influence of the nonlinear optical effects, a method of performing prechirping to a signal is known. This method is a method of compressing pulses by the nonlinear optical effects in a transmission line to compensate for pulse broadening due to dispersion and to simultaneously ensure a high optical signal-to-noise ratio (SNR), thereby increasing a transmission distance. This prechirping method is widely adopted in a practical system.

The group velocity of optical pulses in a normal dispersive fiber becomes larger with an increase in wavelength, whereas the group velocity of optical pulses in an anomalous dispersive fiber becomes larger with a decrease in wavelength. Accordingly, by providing chirping such that a wavelength shift toward longer wavelengths occurs near the leading edge of each pulse (negative chirp) and a wavelength shift toward shorter wavelengths occurs near the trailing edge of each pulse (positive chirp), i.e., by providing up-chirp, pulse compression is caused by transmission in an anomalous dispersive fiber. On the other hand, by providing chirping such that a wavelength shift toward shorter wavelengths occurs near the leading edge of each pulse (positive chirp) and a wavelength shift toward longer wavelengths occurs near the trailing edge of each pulse (negative chirp), i.e., by providing down-chirp, pulse compression is caused by transmission in a normal dispersive fiber.

Further, pulse compression can also be caused by setting the total dispersion to a slight normal dispersion or a slight anomalous dispersion rather than to zero dispersion in carrying out dispersion compensation, and then performing the prechirping under this setting.

In the conventional dispersion compensating methods or the prechirping method, the transmission distance cannot be sufficiently increased.

It is therefore an object of the present invention to provide a method for optical fiber transmission which can increase a transmission distance. It is another object of the present invention to provide an optical device and system which are applicable in carrying out such a method. Other objects of the present invention will become apparent from the following description.

SUMMARY OF THE INVENTION

In accordance with a first aspect of the present invention, there is provided a method for optical fiber transmission. A first optical fiber having dispersion is first provided. An optical signal is next supplied to the first optical fiber so that the optical signal is compressed on the time axis as propagating in the first optical fiber. Then, a compressed optical signal output from the first optical fiber is supplied to an optical device having a saturated gain.

According to this method, the compression of the optical signal in the first optical fiber and waveform shaping of the compressed optical signal in the optical device having a saturated gain are combined together, so that the transmission distance can be effectively increased.

For example, an optical signal output from the optical device is supplied to a second optical fiber. In this case, the transmission distance especially by the second optical fiber can be greatly increased over the prior art by the above-mentioned effective combination in the method according to the present invention.

Preferably, at least one optical amplifier is provided along the first optical fiber. In this case, the peak power of the compressed optical signal can be easily adjusted so as to become greater than a threshold power giving the saturated gain.

In the case that the dispersion of the first optical fiber is normal dispersion, the optical signal can be compressed on the time axis as propagating in the first optical fiber by performing prechirping so that the optical signal has down-chirp.

In the case that the dispersion of the first optical fiber is anomalous dispersion, the optical signal can be compressed on the time axis as propagating in the first optical fiber by performing prechirping so that the optical signal has up-chirp.

In the case of utilizing self-phase modulation (SPM), the optical signal can also be compressed on the time axis as propagating in the first optical fiber by suitably setting the dispersion of the first optical fiber and the power of the optical signal.

A dispersion compensator for compensating the dispersion of the first optical fiber may be provided along the first optical fiber. Further, a dispersion compensator for compensating the dispersion of the second optical fiber may be provided along the second optical fiber.

An optical phase conjugator may be provided in the vicinity of a point where the dispersion of the first optical fiber is substantially equally divided. Further, an optical phase conjugator may be provided in the vicinity of a point where the dispersion of the second optical fiber is substantially equally divided.

In accordance with a second aspect of the present invention, there is provided an optical device to which an optical signal compressed on the time axis as propagating in an optical fiber is supplied. This optical device comprises a semiconductor optical amplifier for applying a gain saturated in concert with an increase in input power to the optical signal.

In accordance with a third aspect of the present invention, there is provided an optical device to which an optical signal compressed on the time axis as propagating in an optical fiber is supplied. This optical device comprises a distributed feedback (DFB) laser and a circuit for supplying a current to the DFB laser so that the DFB laser oscillates at a first wavelength. The optical signal has a second wavelength different from the first wavelength. As a result, the DFB laser can apply a gain saturated in concert with an increase in input power to the optical signal.

In accordance with a fourth aspect of the present invention, there is provided a system for optical fiber transmission. This system comprises an optical transmitter, a first optical fiber, and an optical device. The optical transmitter outputs an optical signal. The first optical fiber is provided so that the optical signal is compressed on the time axis as propagating in the first optical fiber. A compressed optical signal output from the first optical fiber is supplied to the optical device. The optical device has a saturated gain.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 13A to 13E are waveform charts showing experimental results; and

DETAILED DESCRIPTION OF THE PREFERRED EMBODIMENTS

Figure 1:
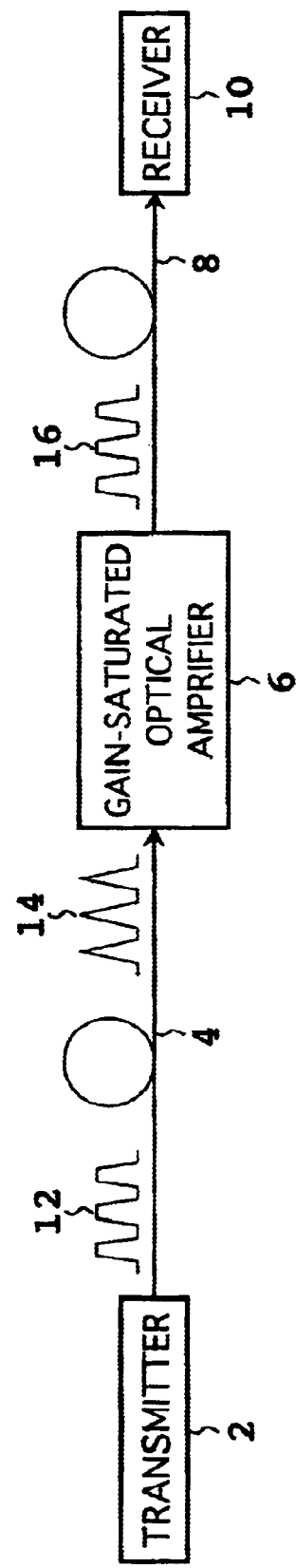
FIG. 1 is a block diagram showing a first preferred embodiment of the system according to the present invention.

Some preferred embodiments of the present invention will now be described in detail with reference to the attached drawings. The same reference numerals in similar drawings denote like or similar parts.

FIG. 1 is a block diagram showing a first preferred embodiment of the system according to the present invention. This system includes a transmitter 2, a gain-saturated optical amplifier 6 connected to the transmitter 2 by a first optical fiber 4, and a receiver 10 connected to the optical amplifier 6 by a second optical fiber 8. The transmitter 2 outputs a pulsed optical signal to the first optical fiber 4 as shown by reference numeral 12. The first optical fiber 4 is provided so that the optical signal output from the transmitter 2 is compressed on the time axis as shown by reference numeral 14 as propagating in the first optical fiber 4. A compressed optical signal output from the first optical fiber 4 is supplied to the optical amplifier 6. The optical amplifier 6 has a saturated gain.

The compressed optical signal supplied to the optical amplifier 6 is provided with the saturated gain by the optical amplifier 6, and the top of each pulse is flattened, thereby waveform-shaping the compressed optical signal. The compressed optical signal thus waveform-shaped is supplied to the second optical fiber 8 as shown by reference numeral 16, and is transmitted to the receiver 10 by the second optical fiber 8.

The optical signal output from the transmitter 2 is compressed on the time axis as propagating in the first optical fiber 4. Accordingly, in the case that the first optical fiber 4 has normal dispersion, the optical signal to be output from the transmitter 2 is provided with down-chirp, whereas in the case that the first optical fiber 4 has anomalous dispersion, the optical signal to be output from the transmitter 2 is provided with up-chirp.

Figure 2:
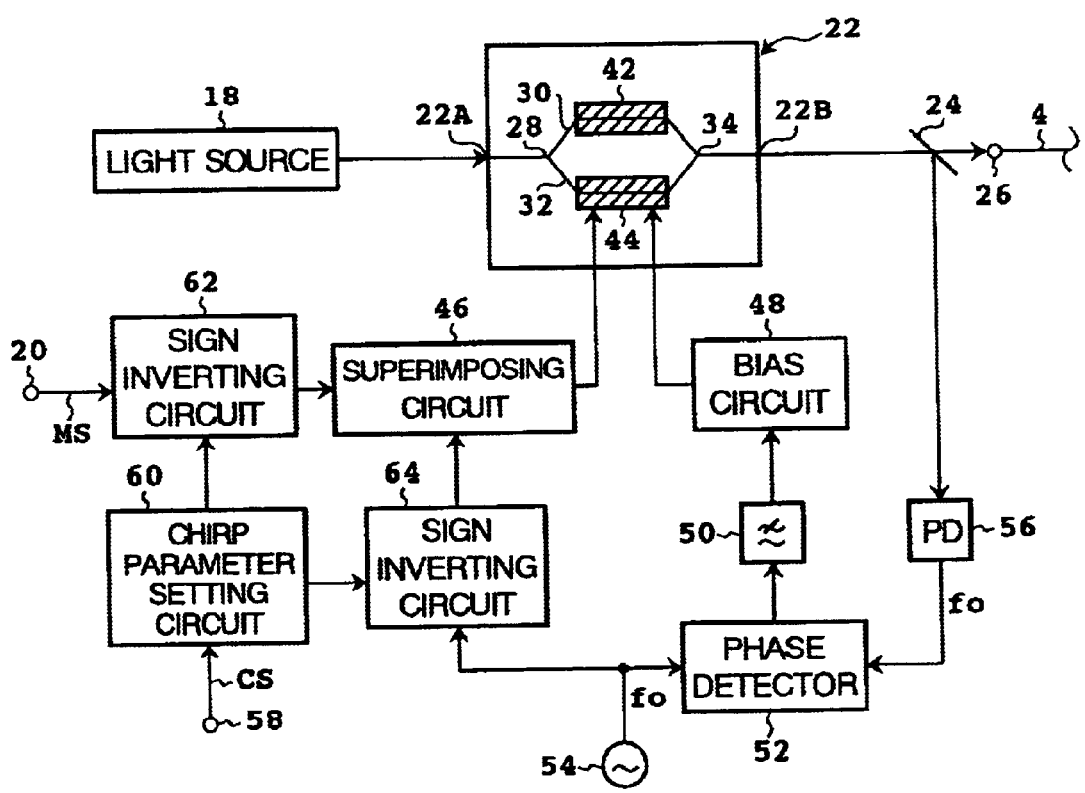
FIG. 2 is a block diagram showing a preferred embodiment of a transmitter applicable to the system according to the present invention.

FIG. 2 is a block diagram showing a preferred embodiment of the transmitter applicable to the system shown in FIG. 1, which can perform prechirping such as down-chirp or up-chirp.

The transmitter shown in FIG. 2 includes a light source 18 such as a laser diode for outputting continuous-wave (CW) light, a port 20 for inputting a modulating signal MS, and a Mach-Zehnder optical modulator (MZ modulator) 22 for modulating the CW light output from the light source 18 according to the modulating signal MS to generate an optical signal. The optical signal thus generated from the MZ modulator 22 is passed through an optical coupler 24 and next output from a port 26 to the first optical fiber 4.

The MZ modulator 22 includes an input port 22A optically connected to the light source 18, an output port 22B optically connected to the optical coupler 24, a pair of optical paths 30 and 32 optically coupled through a Y branch 28 to the input port 22A, and another Y branch 34 for optically coupling the optical paths 30 and 32 to the output port 22B.

The Y branches 28 and 34 and the optical paths 30 and 32 may be obtained by performing thermal diffusion of Ti or the like with a given pattern on a dielectric substrate formed of $LiNbO_3$ or the like to thereby form an optical waveguide structure. A ground electrode 42 and a signal electrode 44 are provided on the optical paths 30 and 32, respectively, to apply an electric field to the optical paths 30 and 32. The signal electrode 44 is provided as a traveling-wave type, for example. The CW light supplied from the light source 18 to the input port 22A is first branched at the Y branch 28 into first and second branch beams having substantially the same power. The first and second branch beams propagate in the optical paths 30 and 32, respectively, and then joined together at the Y branch 34.

The electric field generated between the ground electrode 42 and the signal electrode 44 changes the refractive indices of the optical paths 30 and 32 in opposite directions, thereby producing a phase difference between the first and second branch beams. Then, the first and second branch beams different in phase interfere with each other at the Y branch 34, so that an optical signal intensity-modulated according to the modulating signal MS is output from the output port 22B.

To drive the MZ modulator 22 and stabilize an operating point of the MZ modulator 22, this transmitter further includes a superimposing circuit 46, a bias circuit 48, a low-pass filter 50, a phase detector 52, an oscillator 54, and a photodetector (PD) 56.

Further, this transmitter further includes a port 58 for inputting a control signal CS, a chirp parameter setting circuit 60 operating according to the control signal CS supplied to the port 5B, and two sign inverting circuits 62 and 64, so as to perform prechirping.

A low-frequency signal having a frequency fo output from the oscillator 54 is used to stabilize the operating point. The low-frequency signal is supplied through the sign inverting circuit 64 to the superimposing circuit 46. The modulating signal MS is supplied through the sign inverting circuit 62 to the superimposing circuit 46. The low-frequency signal is superimposed on the modulating signal MS in the superimposing circuit 46, and a resultant superimposed signal is supplied to the signal electrode 44. The superimposing circuit 46 may be configured of a variable-gain amplifier and a capacitor for AC-connecting this amplifier to the signal electrode 44. The sign inverting circuits 62 and 64 are controlled by the chirp parameter setting circuit 60. This control will be hereinafter described more specifically.

A bias voltage controlled so as to stabilize the operating point is supplied from the bias circuit 48 to the signal electrode 44. For this control, a part of the optical signal output from the output port 22B of the MZ modulator 22 is converted into an electrical signal by the photodetector 56. This electrical signal may include a low-frequency component having a frequency fo.

The phase detector 52 is provided as a synchronous detector circuit. The phase detector 52 compares the phase of the low-frequency signal from the oscillator 54 and the phase of the low-frequency component from the photodetector 56. The result of this phase comparison appears in a DC component of the output signal from the phase detector 52. Accordingly, the DC component is extracted by the low-pass filter 50 and then fed back to the bias circuit 48.

In this feedback loop, the bias circuit 48 controls the bias voltage so that the low-frequency component from the photodetector 56 is minimized.

Figure 3:
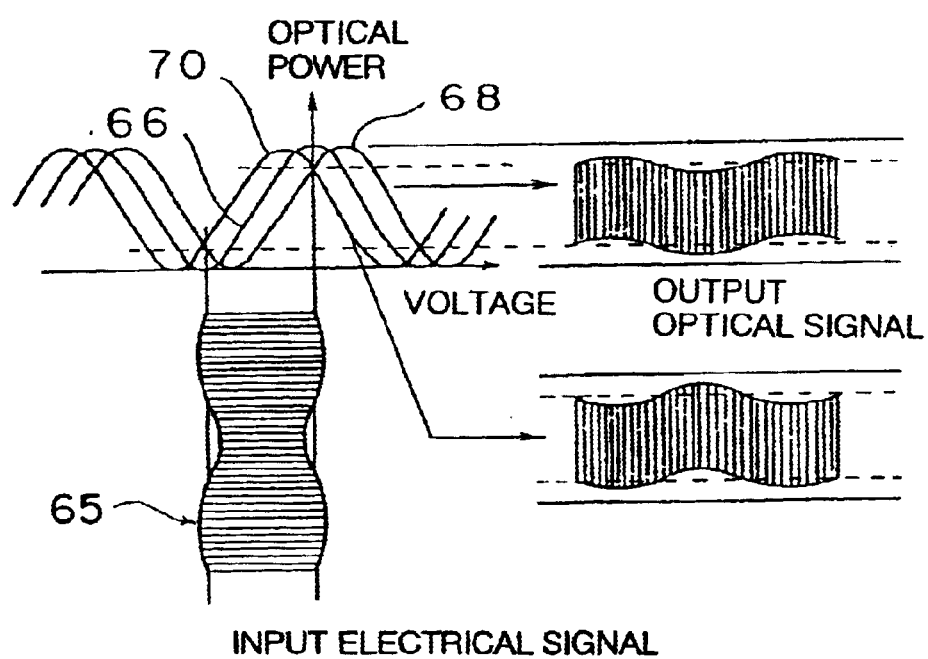
FIG. 3 is a diagram for illustrating the principle of stabilization of an operating point.

Referring to FIG. 3, there is shown the principle of stabilization of the operating point of the MZ modulator 22 shown in FIG. 2. Reference numeral 65 denotes a waveform of an electrical signal (superimposed signal) input to the MZ modulator 22. An optimum operating point of the MZ modulator 22 is determined by an operating characteristic curve in which the high and low levels of the input electrical signal 65 give maximum and minimum output signal powers, respectively. The operating characteristic curve is given by a sine curve showing the relation between optical power and applied voltage. A shift of the operating characteristic curve along the voltage axis is referred to as an operating point drift.

When the operating characteristic curve 66 is shifted to a curve 68 or 70 because of temperature fluctuations or the like, a low-frequency component appears in the output optical signal, and the phase of the low-frequency component reflects a direction of shifting of the curve 66. That is, the envelopes of the output optical signals given by the operating characteristic curves 68 and 70 are different in phase by 180° from each other. Accordingly, the operating point of the MZ modulator 22 can be stabilized by performing synchronous detection by use of the phase detector 52 as shown in FIG. 2.

There will now be described switching of the chirp parameter by use of the sign inverting circuits 62 and 64 with reference to FIGS. 4A to 4D. In the MZ modulator 22, optical switching by interference is performed, and it is therefore possible to perform prechirping by utilizing wavelength fluctuations (chirping) occurring substantially due to interference. The prechirping is a method for suppressing a degradation in transmission waveform due to chromatic dispersion and/or nonlinear effects in an optical fiber transmission line by preliminarily giving wavelength (frequency)

fluctuations within one pulse of an optical signal to be generated. There are a plurality of operating points that may become stable points, because the operating characteristic curve of the MZ modulator 22 is given as a sine curve.

Figure 4A:
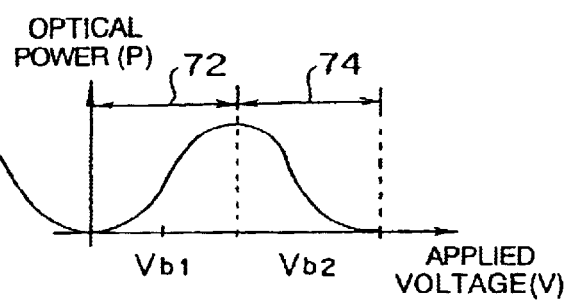
FIGS. 4A to 4D are graphs for illustrating switching of a chirp parameter.
Figure 4B:
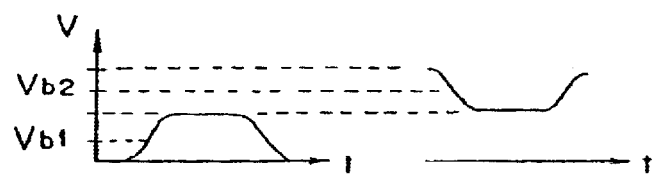
Figure 4C:
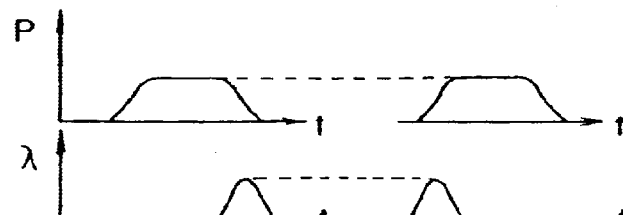
Figure 4D:
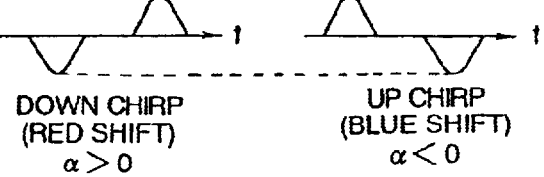

Referring to FIG. 4A, there is shown an operating characteristic curve of the MZ modulator 22. In the case that a positive pulse as shown in the left graph of FIG. 4B is given as the applied voltage by using a region 72 in the vicinity of one stable point Vb1, the optical power (P) increases with an increase in the applied voltage (V) in the region 72. Accordingly, an optical pulse is output with the same polarity as the polarity of the voltage pulse as shown in the left graph of FIG. 4C. In this case, the wavelengths at the leading edge of the optical pulse are shorter than the average value, and the wavelengths at the trailing edge of the optical pulse are longer than the average value as shown in the left graph of FIG. 4D. That is, the wavelength shifts from shorter wavelengths (higher frequencies) toward longer wavelengths (lower frequencies) with respect to time (t) in one optical pulse. This phenomenon is referred to as down-chirp or red shift.

Conversely, in the case that a negative voltage pulse as shown in the right graph of FIG. 4B is given by using a region 74 in the vicinity of another stable point Vb2, the optical power (P) decreases with an increase in the applied voltage (V) in the region 74. Accordingly, an optical pulse is output with a polarity opposite to the polarity of the voltage pulse as shown in the right graph of FIG. 4C. In this case, the wavelength shifts toward longer wavelengths at the leading edge of the optical pulse and shifts toward shorter wavelengths at the trailing edge of the optical pulse as shown in the right graph of FIG. 4D. That is, the wavelength shifts from longer wavelengths (lower frequencies) toward shorter wavelengths (higher frequencies) with respect to time (t) in one optical pulse. This phenomenon is referred to as up-chirp or blue shift.

The chirp parameter α of an optical pulse is given by the following expression.

$$\alpha = 2(d\Phi/dt)(dS/dt)/S$$

where Φ is the optical phase and S is the optical intensity.

In the case of down-chirp, the chirp parameter α takes on positive values, whereas in the case of up-chirp, the chirp parameter α takes on negative values.

When the wavelength of an optical signal is shorter than the zero-dispersion wavelength of an optical fiber used as a transmission line, that is, falls in a region of normal dispersion, longer-wavelength light travels faster than shorter-wavelength light in the optical fiber. Accordingly, by preliminarily giving a prechirping of 0<α (down-chirp), pulse compression occurs. Conversely, the wavelength of an optical signal falls in a region of anomalous dispersion, shorter-wavelength light travels faster than longer-wavelength light. Accordingly, by preliminarily giving a prechirping of α<0 (up-chirp), pulse compression occurs.

In the preferred embodiment shown in FIG. 2, the chirp parameter setting circuit 60 operates to switch the stable points Vb1 and Vb2, thereby switching the sign of the chirp parameter α.

More specifically, the sign inverting circuit 64 is provided to invert the polarity of the low-frequency signal to be supplied from the oscillator 54 to the superimposing circuit 46. When the polarity of the low-frequency signal is switched by the sign inverting circuit 64, the phase of the low-frequency signal to be supplied to the superimposing circuit 46 is inverted. As a result, the direction of control in the feedback loop including the photodetector 56 is reversed. For example, in the case that the stable point before switching is Vb1 shown in FIG. 4A, the stable point after switching becomes Vb2. As a result, the sign of the chirp parameter α is inverted. In this manner, either the down-chirp or the up-chirp can be selected.

In this case, the optical power increases with an increase in the applied voltage at the original stable point Vb1, whereas the optical power decreases with an increase in the applied voltage at the stable point Vb2 after switching. In this respect, the sign inverting circuit 62 for the modulating signal MS is adopted to maintain the relation between the high and low levels of the modulating signal MS identical with the relation between the high and low levels of the optical signal output from the MZ modulator 22.

Figure 5:
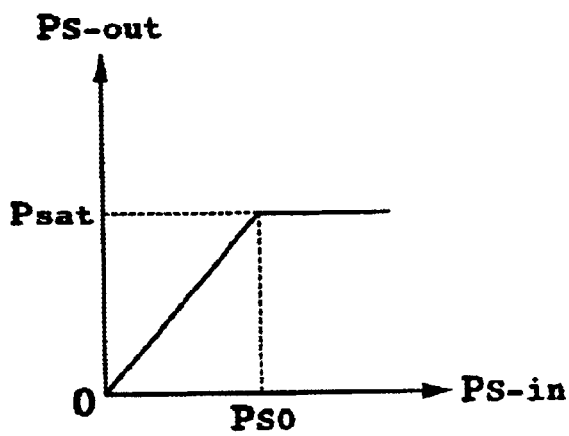
FIG. 5 is a graph showing an example of a characteristic of a gain-saturated optical amplifier.

FIG. 5 is a graph showing an example of the characteristic of the gain-saturated optical amplifier 6 shown in FIG. 1. This graph shows changes in output power $P_{s\text{-}out}$ with changes in input power $P_{s\text{-}in}$. The output power $P_{s\text{-}out}$ is proportional to the input power $P_{s\text{-}in}$ when the input power $P_{s\text{-}in}$ is lower than a threshold $P_{s0}$. However, when the input power $P_{s\text{-}in}$ becomes equal to or higher than the threshold $P_{s0}$, the output power $P_{s\text{-}out}$ becomes a constant value $P_{sat}$.

Accordingly, by setting the peak power of the optical signal to be supplied to the gain-saturated optical amplifier 6 to a value higher than the threshold $P_{s0}$ in the system shown in FIG. 1, the top of each pulse n can be flattened to thereby waveform-shape the optical signal. In general, a highest-speed modulation component tends to be included near the peak of a pulse compressed on the time axis. Accordingly, a signal spectrum can be narrowed by the waveform shaping using the gain-saturated optical amplifier 6. The waveform distortion due to dispersion becomes remarkable in proportion to the square of spectral broadening (bit rate), so that the narrowing of the signal spectrum can reduce the waveform distortion to thereby increase a transmission distance.

When an optical signal is supplied to the gain-saturated optical amplifier 6, the number of photons near the peak of each pulse of the optical signal becomes larger than the number of photons near the leading edge or the trailing edge, thereby exhibiting a phenomenon that gain saturation is enhanced. By using this phenomenon, amplitude fluctuations near the peak of each pulse of a compressed optical signal having amplitude fluctuations can be suppressed. In an optical amplifier such as a semiconductor optical amplifier not in a gain saturated condition, the speed of an input optical signal is limited because of speed limitation (usually, several GHz) of absorption restoration time or carrier density variations, and waveform distortion is added to a signal having a speed higher than the limited speed. To the contrary, in an optical amplifier in a gain saturated condition, excess carriers are recombined in an active layer by stimulated emission, so that the absorption restoration time can be shortened. In a sufficiently saturated condition, a high-speed response of tens of ps or less can be achieved to also allow the waveform shaping of a short pulse having a pulse width of tens of ps or less or the waveform shaping of an ultrahigh-speed signal having a speed of tens to hundreds of Gb/s.

According to the present invention, a simple all-optical waveform shaper not dependent on the bit rate or pulse shape of signal light can be provided by using an optical device having a saturated gain. Further, by combining the waveform shaping operation of the waveform shaper and the compression of an optical signal on the time axis in an optical fiber transmission line, a transmission distance can be increased.

The increasing of a transmission distance in the system shown in FIG. 1 may be considered in the following manner. If a certain length (or certain dispersion) of the second optical fiber 8 provides a transmission limit in the case that the present invention is not applied, the waveform shaping using the gain-saturated optical amplifier 6 according to the present invention allows the waveform and spectrum of a waveform-shaped optical signal to approach the waveform and spectrum of a transmitted optical signal, so that the transmission limit can be expanded by an amount corresponding to the length (or dispersion) of the first optical fiber 4. Accordingly, the tolerance to dispersion can be expanded by an amount corresponding to the dispersion in the first optical fiber 4. In a system to which dispersion compensation is applied, the requirement to the accuracy of dispersion compensation is increasing with an increase in speed of a signal, because the tolerance to dispersion becomes exacting in proportion to the square of the bit rate of the signal. According to the present invention, such dispersion tolerance can be expanded to thereby expand a margin to the total dispersion in a system and to also allow a cost reduction of the system.

Figure 6:
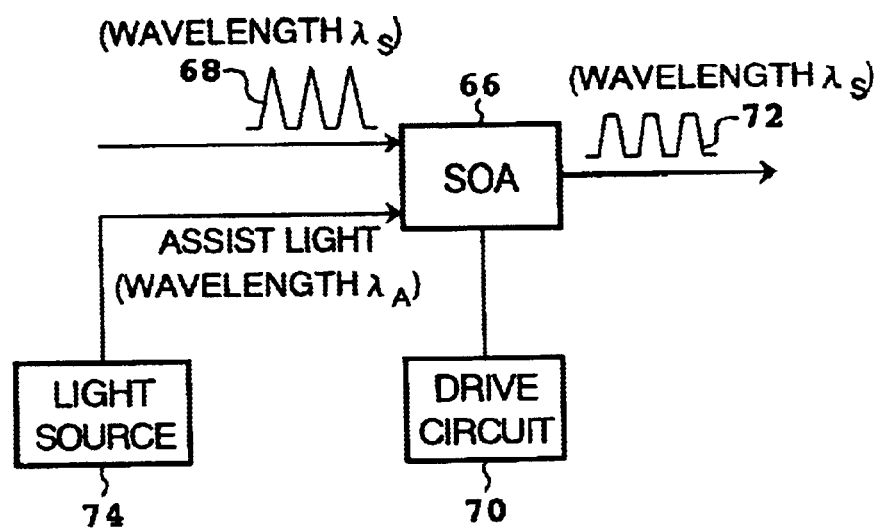
FIG. 6 is a block diagram showing a preferred embodiment of the optical device according to the present invention.

FIG. 6 is a block diagram showing a preferred embodiment of the optical device according to the present invention. This optical device may be used as the gain-saturated optical amplifier 6 in the system shown in FIG. 1. This optical device includes a semiconductor optical amplifier (SOA) 66. An optical signal compressed on the time axis as propagating in an optical fiber is supplied to the semiconductor optical amplifier 66 as shown by reference numeral 68.

The semiconductor optical amplifier 66 is supplied with a drive current from a drive circuit 70 so as to apply a gain saturated in concert with an increase in input power to the supplied optical signal. Accordingly, in the case that the wavelength of the supplied optical signal is $\lambda_S$, a waveform-shaped optical signal also having the wavelength $\lambda_S$ is output from the semiconductor optical amplifier 66 as shown by reference numeral 72.

However, the semiconductor optical amplifier 66 generates amplified spontaneous emission (ASE) noise, and this ASE noise is mainly amplified in an off level of the signal. As a result, there is a case that degradation due to the noise becomes remarkable especially in the off level. To cope with this problem, this preferred embodiment employs a light source 74 for supplying assist light having a wavelength $\lambda_A$ different from the wavelength $\lambda_S$ of the supplied optical signal to the semiconductor optical amplifier 66. By using the light source 74, most of the gain is applied to amplification of the assist light even in the off level of the signal in the semiconductor optical amplifier 66, thereby suppressing the degradation due to the noise.

Figure 7:
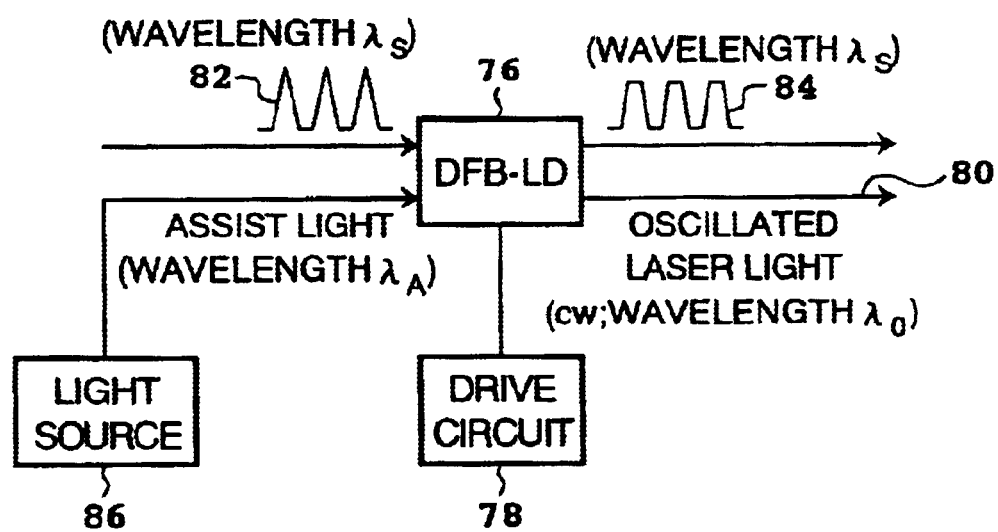
FIG. 7 is a block diagram showing another preferred embodiment of the optical device according to the present invention.

FIG. 7 is a block diagram showing another preferred embodiment of the optical device according to the present invention. This optical device may be used as the gain-saturated optical amplifier 6 in the system shown in FIG. 1. This optical device includes a DFB laser diode (DFB-LD) 76 as a distributed feedback (DFB) laser having a stop band defined as the range of wavelengths allowing laser oscillation. The width of the stop band is 0.5 to 1.0 nm, for example. The DFB-LD 76 is supplied with a drive current from a drive circuit 78 so as to laser-oscillate at a wavelength $\lambda_0$ included in the stop band. Oscillated laser light obtained as the result of this laser oscillation is output from the DFB-LD 76 as shown by reference numeral 80. In general, the oscillated laser light is continuous-wave (CW) light.

The DFB-LD 76 in its oscillating state has a constant clamped gain with respect to the oscillated laser light. An optical signal having a wavelength $\lambda_S$ not included in the stop band is supplied to the DFB-LD 76 in the oscillating state as shown by reference numeral 82. The optical signal supplied is subjected to waveform shaping in the DFB-LD 76, and a resultant waveform-shaped optical signal is output from the DFB-LD 76. The output optical signal has the wavelength $\lambda_S$.

The DFB-LD 76 may be driven by supplying a constant drive current (bias current) to the DFB-LD 76 by using the drive circuit 78 as shown in FIG. 7. However, the present invention is not limited to this method, but a DFB laser may be driven by any other methods such as optical pumping.

In the case that the DFB-LD 76 is driven by a current, which is set to a constant value, the total number of carriers contributing to laser oscillation and signal amplification is constant, and the total number of photons output from the DFB-LD 76 also becomes constant. Accordingly, by inputting an optical signal given as optical pulses into the DFB-LD 76, the number of photons near the peak of each pulse becomes larger than the number of photons near the leading edge or the trailing edge, thereby exhibiting an effect that gain saturation is enhanced. By using this effect, amplitude fluctuations near the peak of each pulse of an optical signal having amplitude fluctuations can be suppressed to thereby perform waveform shaping.

Thus, according to an aspect of the present invention, a DFB laser having an output saturation characteristic or a saturated gain is used, and an optical signal obtained by waveform shaping according to this characteristic is output from the DFB laser.

According to the present invention, it is also possible to suppress the accumulation of amplitude noise due to the accumulation of ASE in a multirepeatered transmission system using a plurality of cascaded optical amplifiers. The waveform degradation due to the accumulation of ASE is mainly due to signal/ASE beat noise, and the waveform degradation becomes most remarkable near the peak of a signal pulse. Accordingly, the application of the present invention can effectively compensate for such waveform degradation.

The reason for the constant saturated output power $P_{sat}$ in the characteristic shown in FIG. 5 in the case of using a DFB laser as in the preferred embodiment shown in FIG. 7 is that when the input power $P_{s-in}$ reaches the threshold $P_{s0}$, the laser oscillation is stopped, and the gain is saturated for input powers higher than the threshold $P_{s0}$, resulting in a constant output power. Accordingly, in the case that the optical signal is provided by optical pulses each having a high level and a low level, the amplitude fluctuations at the high level of the optical signal can be effectively suppressed in the DFB laser by setting the low level to a zero level and setting the high level to a value larger than the threshold $P_{s0}$.

Thus, according to an aspect of the present invention, the power of an optical signal is adjusted so that the amplitude fluctuations at the high level of the optical signal are suppressed in a DFB laser (or gain-saturated optical amplifier). However, the present invention is not limited to this method, but the high level of the optical signal may be set to a value smaller than the threshold $P_{s0}$. The reason for this setting is that there is a case that the output power tends to be saturated for input powers smaller than the threshold, depending upon the dynamic characteristics or the like of a DFB laser.

To supply the compressed optical signal to the DFB-LD 76 in the preferred embodiment shown in FIG. 7, a lens (not shown) for optically coupling an output end of the first optical fiber 4 (see FIG. 1) and a first end of the DFB-LD 76 may be used. Further, to effectively introduce the optical signal output from the DFB-LD 76 to the second optical fiber 8, a lens (not shown) for optically coupling an input end of the second optical fiber 8 and a second end of the DFB-LD 76 may be used. Each lens may be formed integrally with the corresponding optical fiber by heating the end of the corresponding optical fiber.

The stop band of the DFB-LD 76 is defined as the range of wavelengths allowing laser oscillation, so that the wavelength $\lambda_S$ of the oscillated laser light is included in the stop band. The wavelength $\lambda_S$ of the optical signal is limited only by the fact that it is not included in the stop band.

The optical device shown in FIG. 7 further includes a light source 86 for supplying assist light to the DFB-LD 76. The assist light has a wavelength $\lambda_A$ not included in the stop band of the DFB-LD 76. The wavelength $\lambda_A$ is not limited by whether or not it coincides with the wavelength $\lambda_S$ of the optical signal. However, in consideration of signal processing to be performed in the subsequent stage, the wavelength $\lambda_A$ is preferably different from the wavelength $\lambda_S$.

By using the assist light, an excess noise increase at the low level of the optical signal can be suppressed. Further, in the case that the low level of the optical signal continues, undesirable laser oscillation can be prevented to stabilize the operation of the optical device. If the assist light is not used, there is a case that AES-ASE beat noise accumulated at the low level of the optical signal and fluctuations of the low level due to transmitted waveform degradation cannot be effectively suppressed. Further, the oscillating state and unoscillating state of the DPB-LD 76 are repeated with changes of the high level and low level of the optical signal, causing possible instability of the operation of the optical device.

In this preferred embodiment, the assist light has a constant power. Accordingly, the assist light having a constant power is supplied to the DFB-LD 76 also at the low level of the optical signal, thus obtaining the above-mentioned technical effects. The power of the assist light is adjusted so as to suppress an increase in noise at the low level of the optical signal.

In each of the preferred embodiments shown in FIGS. 6 and 7, each of the light sources 74 and 86 is provided so that the assist light propagates in the same direction as that of the optical signal. However, the optical connection of each of the light sources 74 and 86 may be modified so that the assist light propagates in a direction opposite to the propagation direction of the optical signal.

In each of the preferred embodiments shown in FIGS. 6 and 7, an optical bandpass filter having a pass band including the wavelength $\lambda_S$ is preferably used. By using the optical bandpass filter, the optical signal can be easily separated from the assist light in the preferred embodiment shown in FIG. 6, whereas the optical signal can be easily separated from the assist light and the oscillated laser light in the preferred embodiment shown in FIG. 7. Further, additional optical devices such as an optical amplifier and an optical isolator may be provided as required.

Additional details of the waveform shaping using a DFB laser is described in Japanese Patent Application No. 11-133576.

Figure 8:
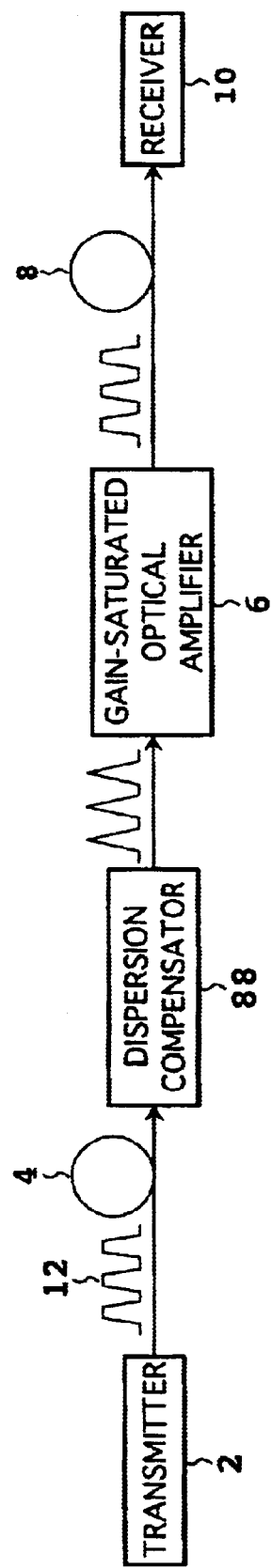
FIG. 8 is a block diagram showing a second preferred embodiment of the system according to the present invention.

FIG. 8 is a block diagram showing a second preferred embodiment of the system according to the present invention. In contrast to the first preferred embodiment shown in FIG. 1, this system is characterized in that a dispersion compensator 88 for compensating the dispersion of the first optical fiber 4 is additionally provided along the first optical fiber 4. The dispersion compensator 88 functions to compensate for waveform distortion due to the dispersion of the first optical fiber 4 during transmission of an optical signal in the first optical fiber 4. By suitably setting the dispersions of the first optical fiber 4 and the dispersion compensator 88, the prechirping to be applied to the optical signal to be output from the transmitter 2, the optical power, and the dispersion compensation amount, the optical signal to be supplied to the gain-saturated optical amplifier 6 is compressed on the time axis. After waveform-shaping the optical signal in the gain-saturated optical amplifier 6, the optical signal is transmitted to the optical receiver 10 by the second optical fiber 8.

While the power of an optical signal to be transmitted is preferably set as high as possible, so as to ensure a high optical SNR, such a high power causes spectral broadening due to nonlinear effects to enlarge waveform degradation due to dispersion. However, by applying pulse compression as in the case of the combination of anomalous dispersion and up-chirp, the waveform degradation can be reduced to thereby increase the optical SNR. In this case, the band of the signal subjected to pulse compression is broadened, so that waveform distortion in further transmission becomes remarkable. However, by flattening the top of each pulse including a highest-speed modulation component in accordance with the present invention, the spectrum can be narrowed to thereby suppress the transmitted waveform distortion in the second optical fiber 8, thereby increasing a transmission distance. Further, in long-haul transmission applying dispersion compensation to multirepeatered transmission using optical amplifiers, a beat noise between signal light and ASE noise of each optical amplifier causes limitation of a transmission distance. However, this beat noise can be suppressed according to the present invention, thereby further increasing the transmission distance.

Although not shown, a dispersion compensator for compensating the dispersion of the second optical fiber 8 may be additionally provided along the second optical fiber 8, thereby allowing a further increase in transmission distance.

Figure 9:
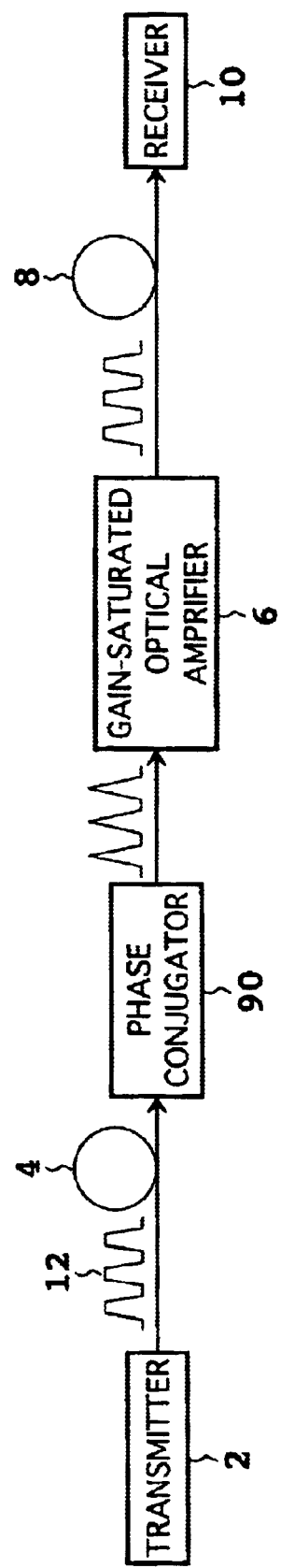
FIG. 9 is a block diagram showing a third preferred embodiment of the system according to the present invention.

FIG. 9 is a block diagram showing a third preferred embodiment of the system according to the present invention. In contrast to the first preferred embodiment shown in FIG. 1, this system is characterized in that the optical signal to be supplied to the gain-saturated optical amplifier 6 is compressed on the time axis by suitably setting the prechirping to be applied to the optical signal to be output from the transmitter 2, the optical power, the dispersion of the fiber 4, and the position where an optical phase conjugator 90 is placed. For example, the optical phase conjugator 90 is placed in the vicinity of a point where the dispersion of the first optical fiber 4 is substantially equally divided.

For example, the optical phase conjugator 90 may be composed of a nonlinear optical medium and a pumping source for supplying pump light to the nonlinear optical medium so that an optical signal is subjected to phase conjugate conversion (wavelength conversion) by nondegenerate four-wave mixing in the nonlinear optical medium. In the case that an optical fiber is used as the nonlinear optical medium, the phase match condition is easily satisfied by making the wavelength of the pump light coincide with the zero dispersion wavelength of the optical fiber, thereby obtaining a high conversion efficiency and a wide conversion band.

By adopting the optical phase conjugator 90, a phase change due to dispersion occurring in the first optical fiber 4 can be compensated. In addition, nonlinear effects in the first optical fiber 4 due to the high power of an optical signal can also be compensated. Accordingly, the transmission distance can be increased by these advantages in combination with the advantages previously mentioned. Further, in long-haul transmission applying waveform distortion compensation by optical phase conjugation to multirepeatered transmission using optical amplifiers, a beat noise between signal light and ASE noise of each optical amplifier causes limitation of a transmission distance. However, this beat noise can be suppressed according to the present invention, thereby further increasing the transmission distance.

Although not shown, an optical phase conjugator may be additionally provided in the vicinity of a point where the dispersion of the second optical fiber 8 is substantially equally divided. In this case, the transmitted waveform distortion in the second optical fiber 8 can be further suppressed to thereby further increase the transmission distance.

Figure 10:
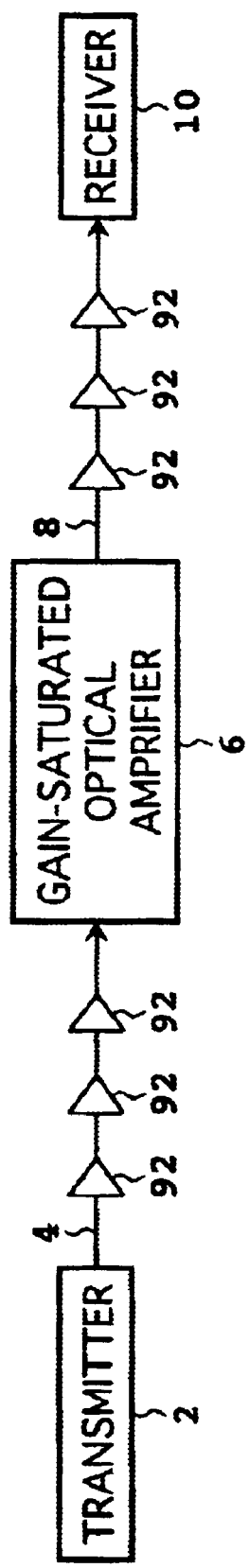
FIG. 10 is a block diagram showing a fourth preferred embodiment of the system according to the present invention.

FIG. 10 is a block diagram showing a fourth preferred embodiment of the system according to the present invention. In contrast to the first preferred embodiment shown in FIG. 1, this system is characterized in that at least one optical amplifier 92 is additionally provided along each of the first and second optical fibers 4 and 8. In such a multirepeatered transmission system, the accumulation of amplitude noise due to the accumulation of ASE can be suppressed by applying the present invention as previously mentioned. Further, by adjusting the gain of each optical amplifier 92 provided along the first optical fiber 4, the peak power of a compressed optical signal to be supplied to the gain-saturated optical amplifier 6 can be easily set higher than the threshold power giving a saturated gain in the optical amplifier 6.

In each preferred embodiment of the system according to the present invention, the gain-saturated optical amplifier 6 is provided along the optical fiber transmission line connecting the transmitter 2 and the receiver 10. Accordingly, the gain-saturated optical amplifier 6 may be used as a waveform shaping section in an all-optical 2R regenerative repeater or an all-optical 3R regenerative repeater. Although not shown, the second optical fiber 8 may be omitted and the gain-saturated optical amplifier 6 may be provided in the receiver 10.

The present invention may be carried out in combination with WDM (wavelength division multiplexing). For example, in the case that all channels can be compensated at a time by the gain-saturated optical amplifier 6 in the system shown in FIG. 1, the system shown in FIG. 1 can be applied to WDM without any changes. In the case that all channels cannot be compensated at a time by the single gain-saturated optical amplifier 6 because of interchannel crosstalk or the like in WDM, the system shown in FIG. 1 may be modified in such a manner that WDM signal light transmitted by the first optical fiber 4 is separated into individual channels or an appropriate number of groups of plural channels by using an optical demultiplexer, that each channel or each group of plural channels is next subjected to waveform shaping by using a plurality of gain-saturated optical amplifiers, that resultant waveform-shaped optical signals of all the channels are next combined together by using an optical multiplexer, and that resultant WDM signal light after waveform-shaped is transmitted by the second optical fiber 8.

There will now be described a demonstrative experiment of the present invention with reference to FIGS. 11 to 14.

Figure 11:
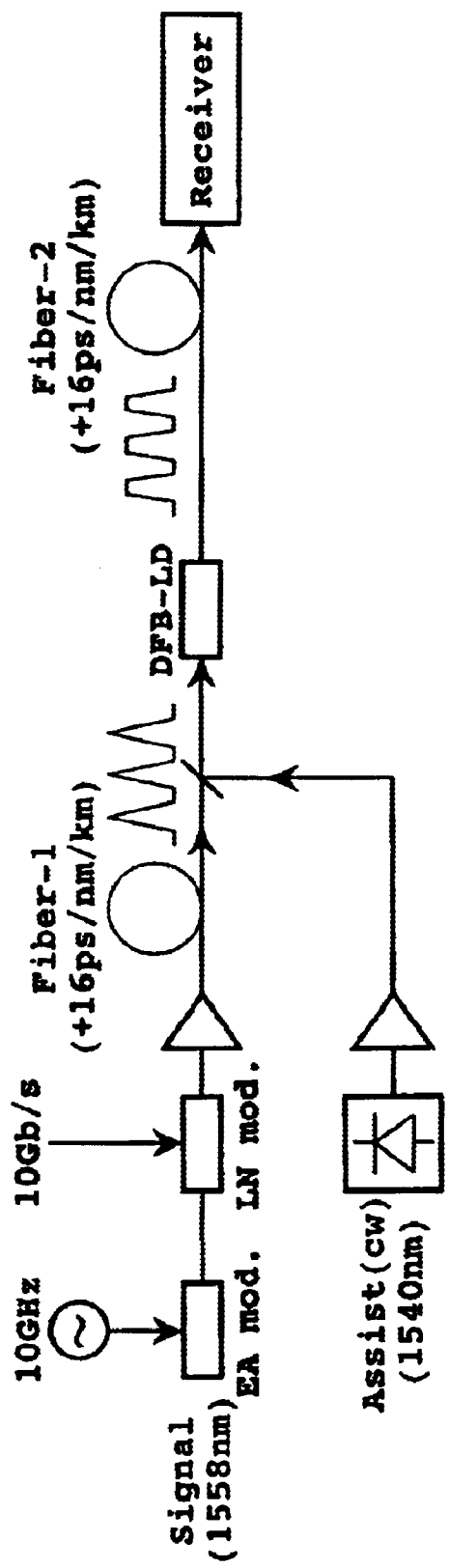
FIG. 11 is a block diagram of a system used for a demonstrative experiment.

FIG. 11 is a block diagram of a system used for the demonstrative experiment. Signal light (Signal) having a wavelength of 1558 nm was intensity-modulated with a sinusoidal wave having a frequency of 10 GHz by using an electroabsorption (EA) modulator (EA mod.), and was further modulated with a 10 Gb/s data signal (PN: $2^{23-1}$) by using an LN modulator (LN mod.). Resultant pulses generated were RZ pulses each having a width of about 30 ps.

The RZ modulated pulses were transmitted by a single-mode fiber (Fiber-1) having a dispersion of about +16 ps/nm/km, and then combined with assist light (Assist) having a wavelength of 1540 nm. These combined signal light and assist light were next input into a DFB-LD as a gain-saturated optical amplifier or gain-clamped optical amplifier. The power of the assist light input into the DFB-LD was about 15 mW. The drive current for the DFB-LD was 400 mA, the oscillation wavelength was 1550 nm, and the oscillation power was about 40 mW. Signal light output from the DFB-LD was transmitted by a single-mode fiber (Fiber-2) having the same dispersion as that of Fiber-1 and a length L, and finally received by a receiver (Receiver).

Figure 12:
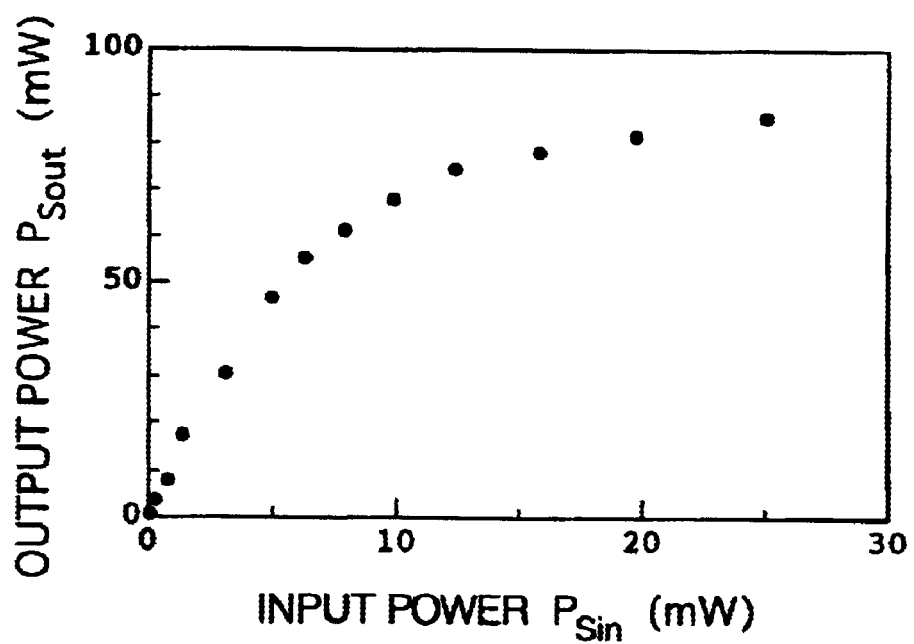
FIG. 12 is a graph showing a characteristic of a DFB-LD used in the experiment.

FIG. 12 is a graph showing measured results of changes in output power $P_{Sout}$ with changes in input power $P_{Sin}$ of the DFB-LD used in this experiment. In this measurement, unmodulated signal light was used. It is understood from FIG. 12 that the output power is saturated for the input power of about 8 mW or more.

Further, a transmission experiment was made by setting the modulated RZ pulses so that the peak power of each pulse becomes sufficiently greater than the threshold of 8 mW obtained by the above measurement. FIGS. 13A to 13E show changes in waveform of the pulses. More specifically, FIG. 13A shows an original waveform, FIG. 13B shows an input waveform to the DFB-LD, FIG. 13C shows an output waveform from the DFB-LD, FIG. 13D shows a received waveform at L=40 km in the case that the waveform shaping by the DFB-LD was not carried out, and FIG. 13E shows a received waveform at L=40 km in the case that the waveform shaping by the DFB-LD was carried out. It is understood from FIGS. 13A to 13E that the peak of each pulse was slightly flattened in the vertical direction by the waveform shaping using the DFB-LD and that the effect of suppression of waveform degradation by the waveform shaping over 40 km transmission was remarkable. Further, it is apparent that in the case of not passing the pulses through the DFB-LD, the waveform is remarkably distorted by the dispersion and nonlinear effects (FIG. 13D) and that in the case of passing the pulses through the DFB-LD, this waveform distortion is suppressed (FIG. 13E).

Figure 14:
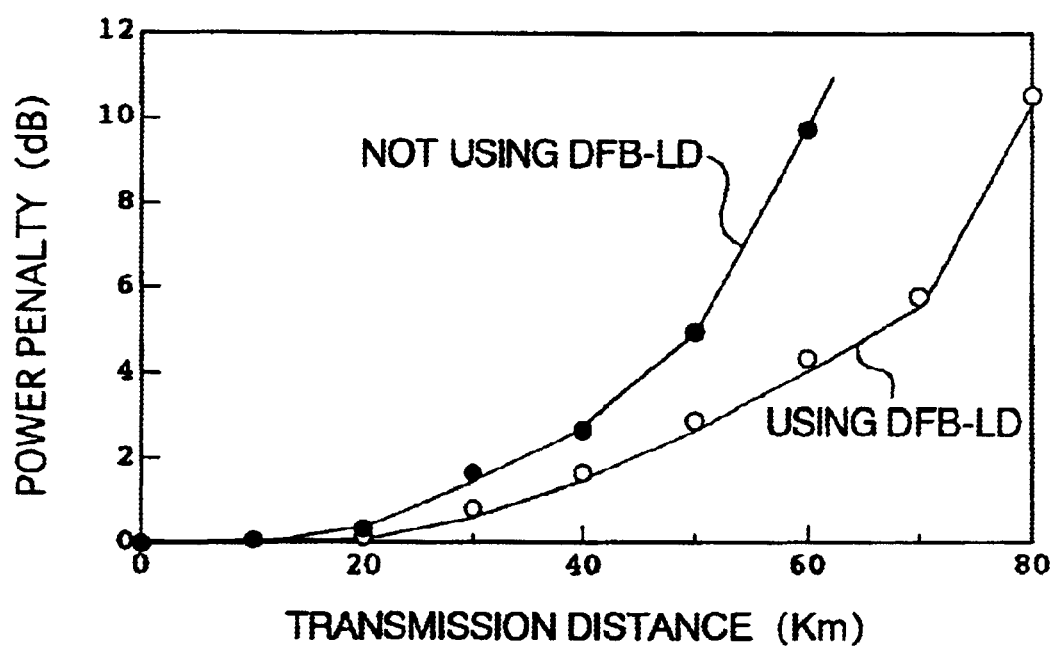
FIG. 14 is a graph showing an improvement in power penalty in the experiment.

FIG. 14 is a graph showing changes in power penalty (BER=$10^{-9}$) with changes in transmission distance. It is understood from FIG. 14 that the transmission distance is increased 15 to 20 km by using the DFB-LD. That is, it was confirmed that the transmission distance at a power penalty of 1dB can be increased 20 km without dispersion compensation by the method of the present invention using DFB-LD.

The effect by the method of the present invention is not dependent on a bit rate and a pulse shape. Actually, the RZ pulses each having a width of 30 ps used in this experiment correspond to a bit rate of 30 Gb/s, and it is apparent that they can be applied to sufficiently high-speed transmission. Although the present invention is a simple method, the transmission distance can be increased (without dispersion compensation) by the present invention. Further, the tolerance to dispersion of the system can be expanded, and an exact setting accuracy of dispersion compensation which accuracy becomes greatly significant especially in high bit rates can be relaxed.

According to the present invention as described above, it is possible to provide a method for optical fiber transmission which can increase a transmission distance. Further, it is also possible to provide a novel optical device and system which are applicable to such a method.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:

(a) providing a first optical fiber having dispersion;

(b) supplying an optical signal to said first optical fiber so that said optical signal is compressed on the time axis as propagating in said first optical fiber;

(c) supplying a compressed optical signal output from said first optical fiber to an optical device having a saturated gain; and (d) changing, by the optical device, spectrum of the optical signal.

2. A method according to claim 1, further comprising supplying an optical signal output from said optical device to a second optical fiber.

3. A method according to claim 1, further comprising:

providing at least one optical amplifier along said first optical fiber; and adjusting the peak power of said compressed optical signal so that the peak power becomes higher than a threshold power giving said saturated gain.

4. A method according to claim 1, wherein:

the dispersion of said first optical fiber is normal dispersion; and said (b) includes performing prechirping so that said optical signal has down-chirp.

5. A method according to claim 1, wherein:

the dispersion of said first optical fiber is anomalous dispersion; and said (b) includes performing prechirping so that said optical signal has up-chirp.

6. A method according to claim 1, wherein said (b) includes suitably setting the dispersion of said first optical fiber and the power of said optical signal.

7. A method according to claim 1, further comprising providing a dispersion compensator for compensating the dispersion of said first optical fiber along said first optical fiber.

8. A method according to claim 2, further comprising providing a dispersion compensator for compensating the dispersion of said second optical fiber along said second optical fiber.

9. A method according to claim 1, further comprising providing an optical phase conjugator in the vicinity of a point where the dispersion of said first optical fiber is substantially equally divided.

10. A method according to claim 2, further comprising providing an optical phase conjugator in the vicinity of a point where the dispersion of said second optical fiber is substantially equally divided.

11. A system comprising:

an optical transmitter outputting an optical signal;

a first optical fiber provided so that said optical signal is compressed on the time axis as propagating in said first optical fiber; and an optical device to which a compressed optical signal output from said first optical fiber is supplied, said optical device having a saturated gain and changing spectrum of the optical signal.

12. A system according to claim 11, further comprising a second optical fiber to which an optical signal output from said optical device is supplied.

13. A system according to claim 11, wherein said optical device comprises a semiconductor optical amplifier applying a gain saturated in concert with an increase in input power to said optical signal.

14. A system according to claim 13, wherein said optical device further comprises a light source supplying assist light having a wavelength different from the wavelength of said optical signal to said semiconductor optical amplifier.

15. A system according to claim 11, wherein:

said optical device comprises a distributed feedback (DFB) laser and a circuit for supplying a current to said DFB laser so that said DFB laser oscillates at a first wavelength;

said optical signal having a second wavelength different from said first wavelength, whereby said DFB laser applies a gain saturated in concert with an increase in input power to said optical signal.

16. A system according to claim 15, wherein said optical device further comprises a light source supplying assist light having a third wavelength different from said first wavelength to said DFB laser.

17. A system according to claim 11, further comprising at least one optical amplifier provided along said first optical fiber;

the peak power of said compressed optical signal being set so as to become higher than a threshold power giving said saturated gain.

18. A system according to claim 11, wherein:

said first optical fiber has normal dispersion; and said optical transmitter includes means for performing prechirping so that said optical signal has down-chirp.

19. A system according to claim 11, wherein:

said first optical fiber has anomalous dispersion; and said optical transmitter includes means for performing prechirping so that said optical signal has up-chirp.

20. A system according to claim 11, further comprising a dispersion compensator provided along said first optical fiber for compensating the dispersion of said first optical fiber.

21. A system according to claim 12, further comprising a dispersion compensator provided along said second optical fiber for compensating the dispersion of said second optical fiber.

22. A system according to claim 11, further comprising an optical phase conjugator provided in the vicinity of a point where the dispersion of said first optical fiber is substantially equally divided.

23. A system according to claim 12, further comprising an optical phase conjugator provided in the vicinity of a point where the dispersion of said second optical fiber is substantially equally divided.

* * * * *

UNITED STATES PATENT AND TRADEMARK OFFICE
CERTIFICATE OF CORRECTION

PATENT NO.     : 6,847,758 B1
DATED          : January 25, 2005
INVENTOR(S)    : Shigeki Watanabe It is certified that error appears in the above-identified patent and that said Letters Patent is hereby corrected as shown below:

<u>Title page,</u>
Item [56], References Cited, U.S. PATENT DOCUMENTS, insert the following:

| | | |
|---|---|---|
| 5,798,853 | 8/98 | Wantanabe |
| 5,587,827 | 12/96 | Hakimi et al. |
| 0 862285 | 9/98 | Europe |
| 96/23372 | 8/96 | WIPO |
| 0 708538 | 4/96 | Europe |
| 0 375253 | 6/90 | Euope |

<u>Column 15,</u>
Line 17, after "gain" insert -- thereby flattening a top of each pulse of said compressed optical signal --;
Line 18, delete "changing, by the optical device, spectrum of the optical signal" and insert -- supplying an optical signal output from said optical device to a second optical fiber --;
Line 20, delete Claim 2;
Lines 46 and 54, change "2" to -- 1 --;

<u>Column 16,</u>
Line 3, delete "and changing spectrum of the optical signal" and insert -- thereby flattening a top of each pulse of said compressed optical signal, and second optical fiber to which an optical signal output from said optical device is supplied --;
Line 5, delete claim 12;
Lines 47 and 55, change "12" to -- 11 --;
After claim 23, insert the following:

> 24. A method comprising
> (a) providing a first optical fiber having dispersion;
> (b) supplying an optical signal to said first optical fiber so that said optical signal is compressed on a time axis as propagating in said first optical fiber; and
> (c) supplying a compressed optical signal output from said first optical fiber to an optical device having saturated gain thereby flattening atop of each pulse of said compressed optical signal.

UNITED STATES PATENT AND TRADEMARK OFFICE
CERTIFICATE OF CORRECTION

PATENT NO. : 6,847,758 B1
DATED : January 25, 2005
INVENTOR(S) : Shigeki Watanabe It is certified that error appears in the above-identified patent and that said Letters Patent is hereby corrected as shown below:

<u>Column 16 (cont'd),</u>
After claim 24, insert the following:

25. A system comprising:
an optical transmitter for outputting an optical signal;
a first optical fiber provided so that said optical signal is compressed on a time axis as propagating in said first optical fiber; and
    an optical device to which a compressed optical signal output from said first optical fiber is supplied, said optical device having a saturated gain to thereby flatten a top of each pulse of said compressed optical signal.

Signed and Sealed this

Fourth Day of April, 2006

JON W. DUDAS
*Director of the United States Patent and Trademark Office*